United States Patent [19]
Moghadam

[11] 3,994,016
[45] Nov. 23, 1976

[54] HEAD POSITIONING SERVO SYSTEM FOR DISK DRIVES

[75] Inventor: Hossein Moghadam, Norman, Okla.

[73] Assignee: Honeywell Information Systems, Inc., Waltham, Mass.

[22] Filed: Mar. 31, 1975

[21] Appl. No.: 563,944

[52] U.S. Cl. ................................. 360/77; 360/78; 360/98
[51] Int. Cl.² ...................... G11B 5/56; G11B 21/8; G11B 21/10
[58] Field of Search .................. 360/77, 75, 78, 98, 360/109, 69, 133; 318/615–616, 628, 638, 653

[56] References Cited
UNITED STATES PATENTS

| | | | |
|---|---|---|---|
| 3,246,307 | 4/1966 | Stanley | 360/77 |
| 3,474,432 | 10/1969 | Sevilla | 360/77 |
| 3,479,664 | 11/1969 | Stuart-Williams et al. | 360/77 |
| 3,699,555 | 10/1972 | Du Vall | 360/78 |
| 3,737,883 | 6/1973 | Sordello | 360/78 |
| 3,789,378 | 1/1974 | Bonzano et al. | 360/77 |

*Primary Examiner*—Alfred H. Eddleman
*Attorney, Agent, or Firm*—Ronald T. Reiling; William F. White

[57] ABSTRACT

A closed loop head positioning servo system is disclosed for use in a disk drive employing a disk pack having a dedicated servo surface and a number of data surfaces carrying both data and servo information. A track counting coarse positioning system is used to move the heads in a ganged assembly to the vicinity of a desired cylinder. A fine positioning system includes one error circuit for generating an error signal representing the deviation of a servo head from a desired cylinder on the dedicated servo surface. Another error circuit generates a second error signal representing the offset of a selected data head from a selected data track in the same cylinder. Analog circuits combine the error signals to produce an output signal which, when applied to an actuator, centers the selected data head on the selected track.

14 Claims, 6 Drawing Figures

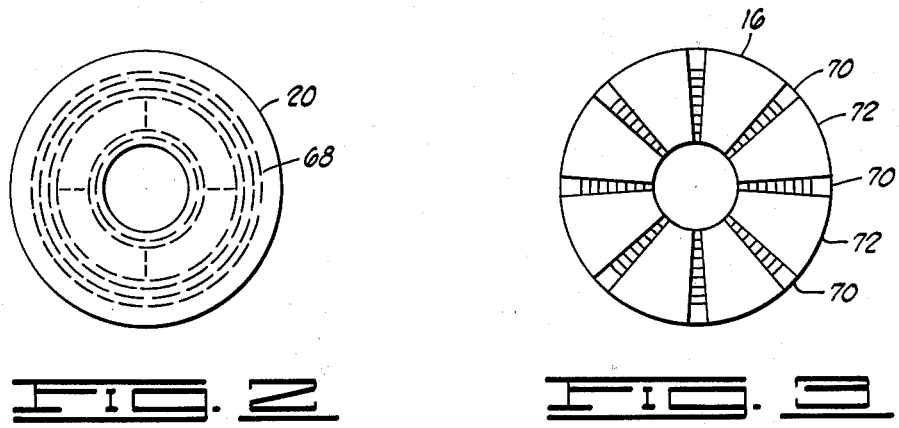
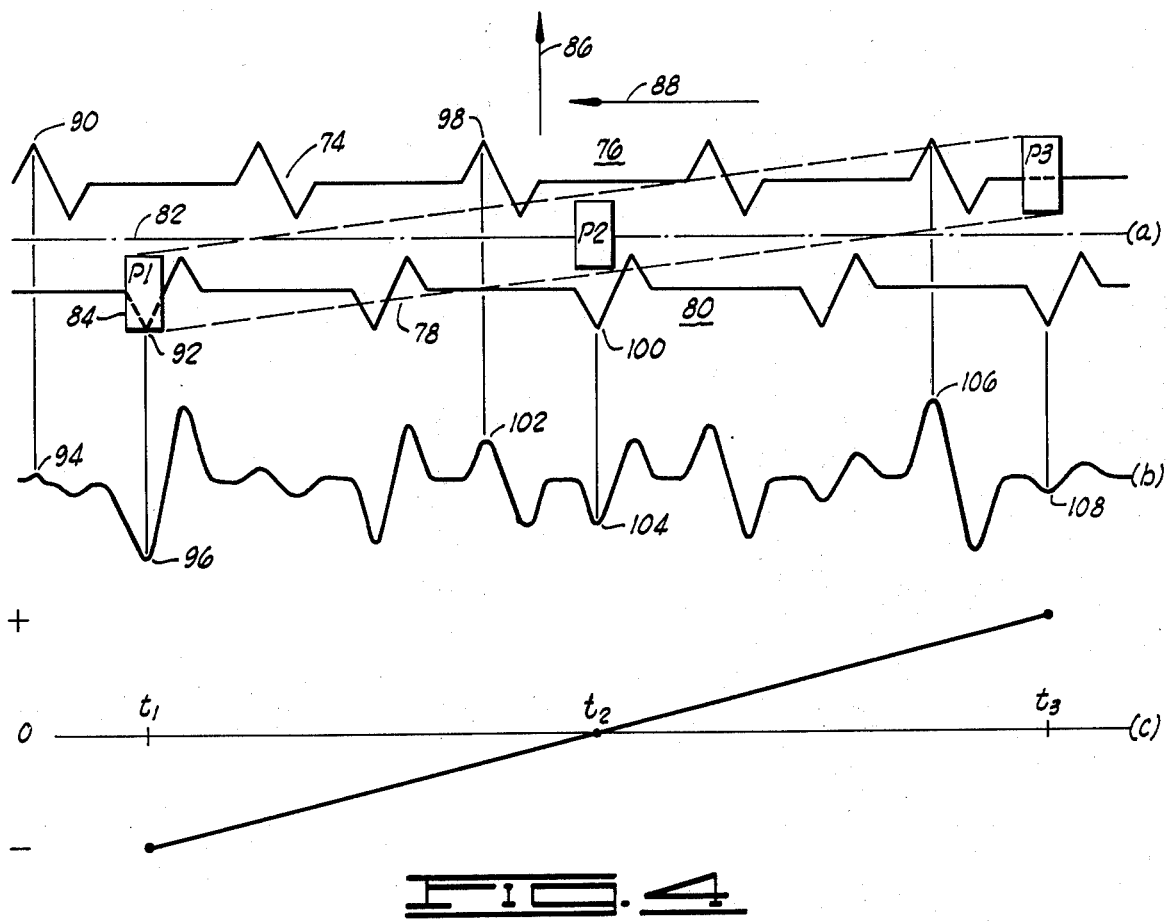

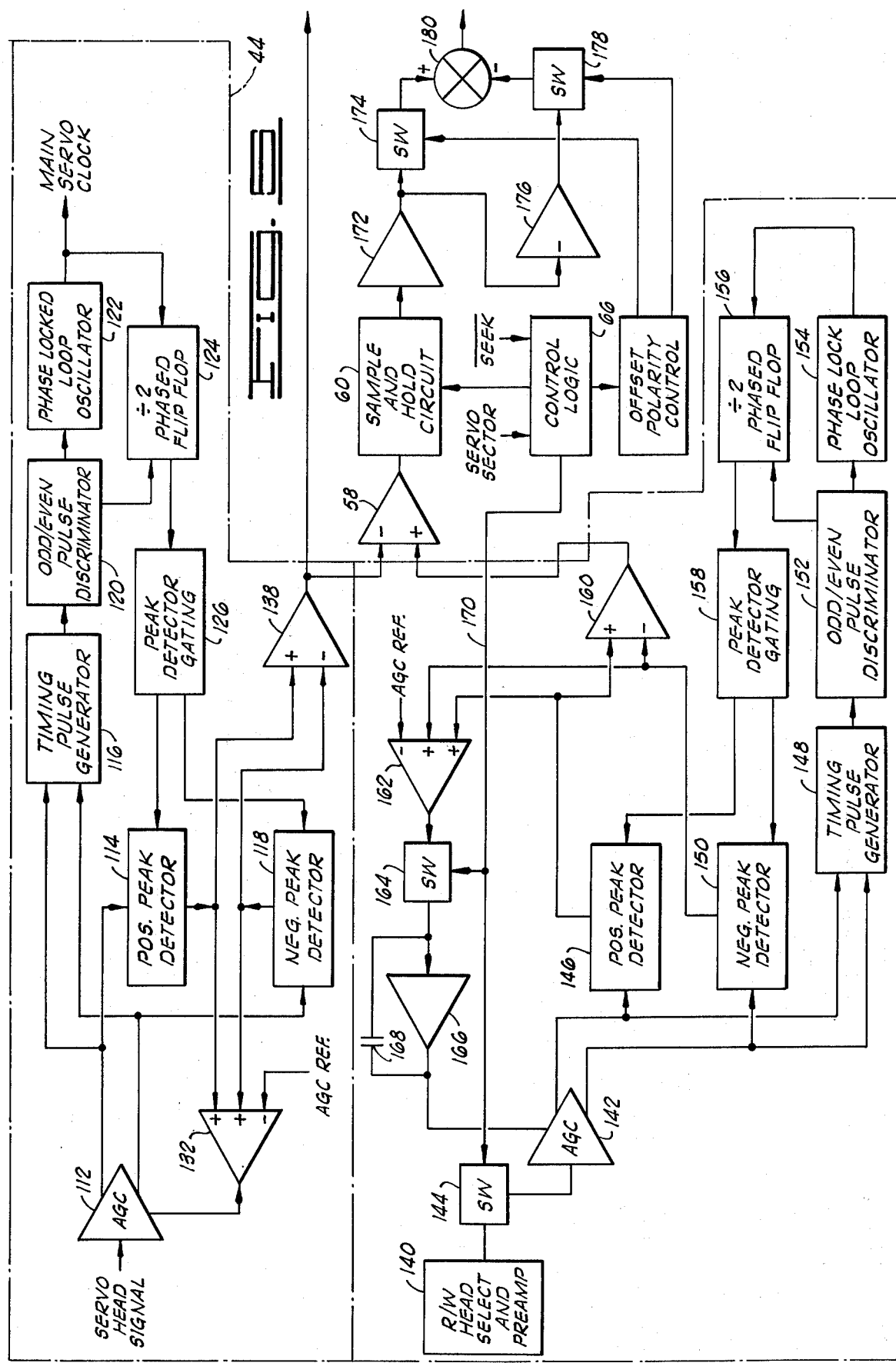

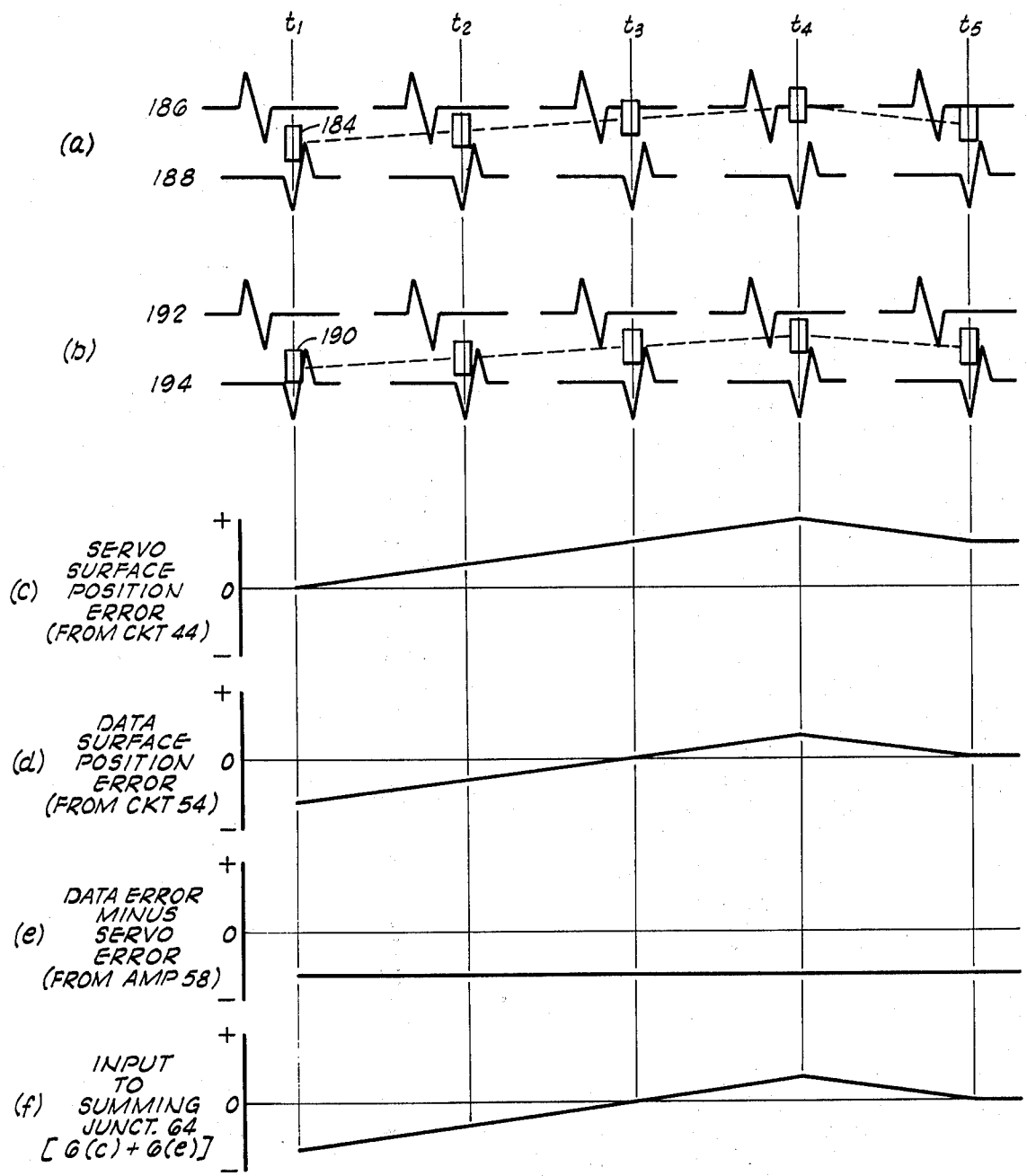

HEAD POSITIONING SERVO SYSTEM FOR DISK DRIVES

BACKGROUND OF THE INVENTION

The present invention relates to disk drives and more particularly to an improved closed loop head positioning servo system for use in such drives.

Disk drives normally employ coarse positioning subsystems for moving heads to the proximity of addressed tracks on recording surfaces and fine positioning subsystems for moving those heads into final alignment with the addressed tracks. There are two basic categories of head positioning servo systems, open loop systems and closed loop systems.

In open loop head positioning servo systems, both coarse and fine positioning are controlled by indexing mechanisms that are mechanically or electrically coupled to the carriage assembly for the heads.

In one type of open loop system, a reticle is attached to the movable carriage assembly and a photocell is attached to a stationary support adjacent the carriage assembly. Movement of the carriage assembly causes the photocell to generate a modified sine wave. The peaks of the sine wave are related to the tracks crossed on the recording surface during movement of the carriage assembly. Pulses derived from the sine wave are used to decrement a register initially set at a count representing the number of tracks between the initial position of the carriage assembly and its desired position. When the register is decremented to zero, it is assumed the heads, which are rigidly attached to the carriage assembly, are aligned with the addressed track.

In some prior art head positioning servo systems, no further fine positioning is provided. The assumption is made that the head is positioned acceptably close to the center line of the desired track by the coarse positioning subsystem. In other prior art servo systems, a provided fine positioning subsystem is activated when the head approaches the addressed track. The fine positioning subsystem is sensitive to smaller increments of movement than the coarse positioning subsystems and therefore can be used to more precisely position the carriage assembly. Mechanical and magnetic equivalents of the above-described open loop servo systems are known in the prior art.

The disadvantage of all open loop servo systems is that such systems actually position the carriage assembly (and heads) with reference to a stationary part of the disk drive but not with reference to recorded data on the recording surfaces. If the heads in the carriage assembly are not in designed positions relative to the indexing mechanism on the carriage assembly, which can happen as a result of manufacturing process tolerances or abuse during shipment, installation or use of the disk drive, the indexing mechanism can position the carriage assembly exactly where it is supposed to be but the heads will remain offset from the center of the data tracks.

Even if the heads are located exactly as designed relative to the indexing mechanism, heads positioned by open loop systems may become offset from track center periodically during normal read/write operations. This is because a disk pack rotates about an axis which only theoretically remains vertical through the center of a drive spindle. In fact, disk packs normally wobble or revolve in an eccentric orbit about the spindle. As a result, an open loop system head, which becomes immovable once the carriage assembly reaches the desired position, may be centered on an addressed track only during a part of each revolution of the disk pack.

Open loop head positioning servo systems are satisfactory for disk drives in which the number of tracks per inch (track density) is low. Relatively large inter-track spacing and relatively wide recording tracks employed in such drives allow the open loop servo system to position the heads acceptably near, if not on, the center lines of the tracks.

For disk drives which read or write at higher track densities, the heads are generally positioned with reference to information written on the recording surfaces rather than with reference to a stationary support in the disk drive. Such systems are referred to as closed loop or track following servo systems.

In one widely used closed loop head positioning servo system, one surface of a disk is dedicated to tracks of pre-recorded servo information. A read only transducer or servo head detects the pre-recorded servo information on a selected servo track to provide signals which are processed by logic circuits. These signals are employed to cause the servo head and all other heads in a mechanically ganged head assembly to follow the selected servo track. A disadvantage of this type of closed loop system is that the servo head and the data heads may not be aligned with one another due to manufacturing process tolerances or abuse of the head assembly. Thus, notwithstanding the servo head may follow the centerline of the servo track in a selected cylinder, the data heads may be permanently offset by differing amounts from the centerlines of the data tracks in the same cylinder.

In another type of closed loop head positioning servo system, which could be described as a single surface system, servo information is recorded on the same surfaces on which data is to be recorded. In one such system, the servo information is recorded in a number of servo tracks separated from one another by one or more data tracks. Where the servo tracks are separated by a single data track, the servo information in adjacent servo tracks is normally recorded at differing frequencies far below the frequency at which the data is recorded. A single head can be used to read both data and servo information in a single channel. The term "channel" as used herein refers to that area on a disk surface which can be read by a single head without repositioning. In the system just described, a channel would consist of a data track and the two parallel servo tracks on opposite edges of the data track. By passing the detected signal through low frequency filters, the servo signals being read from adjacent servo tracks can be separated and processed to derive head position error signals. The head is driven to a position in which the two servo signals are equally strong; i.e., midway between the servo tracks and thus centered on the data track. The servo information recording technique described above is intended as an example only. A number of different techniques for recording and extracting servo information are known in the art.

In a variant of the single surface system described immediately above, the pre-recorded servo information is confined to a limited number of radial sectors on the disk surface. The sectors of the disk surface between the servo sectors are used for data. A single transducer is used to read and write data and also to detect the pre-recorded servo information as the transducer traverses a servo sector.

One disadvantage of the single surface systems relative to the dedicated servo surface system described earlier is that the single surface systems are subject to catastrophic write failures. If a head erroneously erases data from the recording surface, the servo information on the surface can be obliterated resulting in a partial or perhaps total loss of servo capability. The dedicated servo surface system is not subject to catastrophic write failure since its servo head is a read-only transducer.

Another disadvantage of the single surface systems is that a significant portion of the data surface is normally dedicated to the recording of servo information, reducing the data storage capacity of the surface.

SUMMARY OF THE INVENTION

The present invention is a closed loop head positioning servo system to be used in a disk drive which employs a ganged head assembly and a multiple surface disk recording medium having at least one servo surface dedicated to tracks of servo information and one or more data surfaces which carry both data and servo information. The invention includes a servo surface position error circuit including a servo head. This circuit generates a first error signal representing the position of the servo head relative to the center of a selected channel on the servo surface. The servo system also includes a data surface position error circuit connected to the data heads in the ganged assembly. The data heads sense servo information recorded on the data surfaces to generate a second error signal representing the position of a selected head relative to the center of a selected channel on a data surface. The system includes a circuit for establishing a difference signal representing the difference between the first and second error signals. A summing circuit combines the first error signal and the difference signal to produce an output signal which is applied to a head positioning means for moving the head assembly toward a position wherein the second error signal is minimized; i.e., the selected data head is centered relative to the selected track on a data surface.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 2 is a top view of a dedicated servo surface of a disk pack for use in the subject servo system;

FIG. 3 is a top view of a typical data surface which may be used in the subject servo system;

FIG. 4 is a chart of waveforms and signals which occur during the detection of servo information;

FIG. 5 is a block diagram of the fine positioning section of the head positioning servo system; and FIG. 6 is a chart of servo information and error signals to be used in an explanation of the operation of a servo system embodying the present invention.

DETAILED DESCRIPTION

Figure 1:
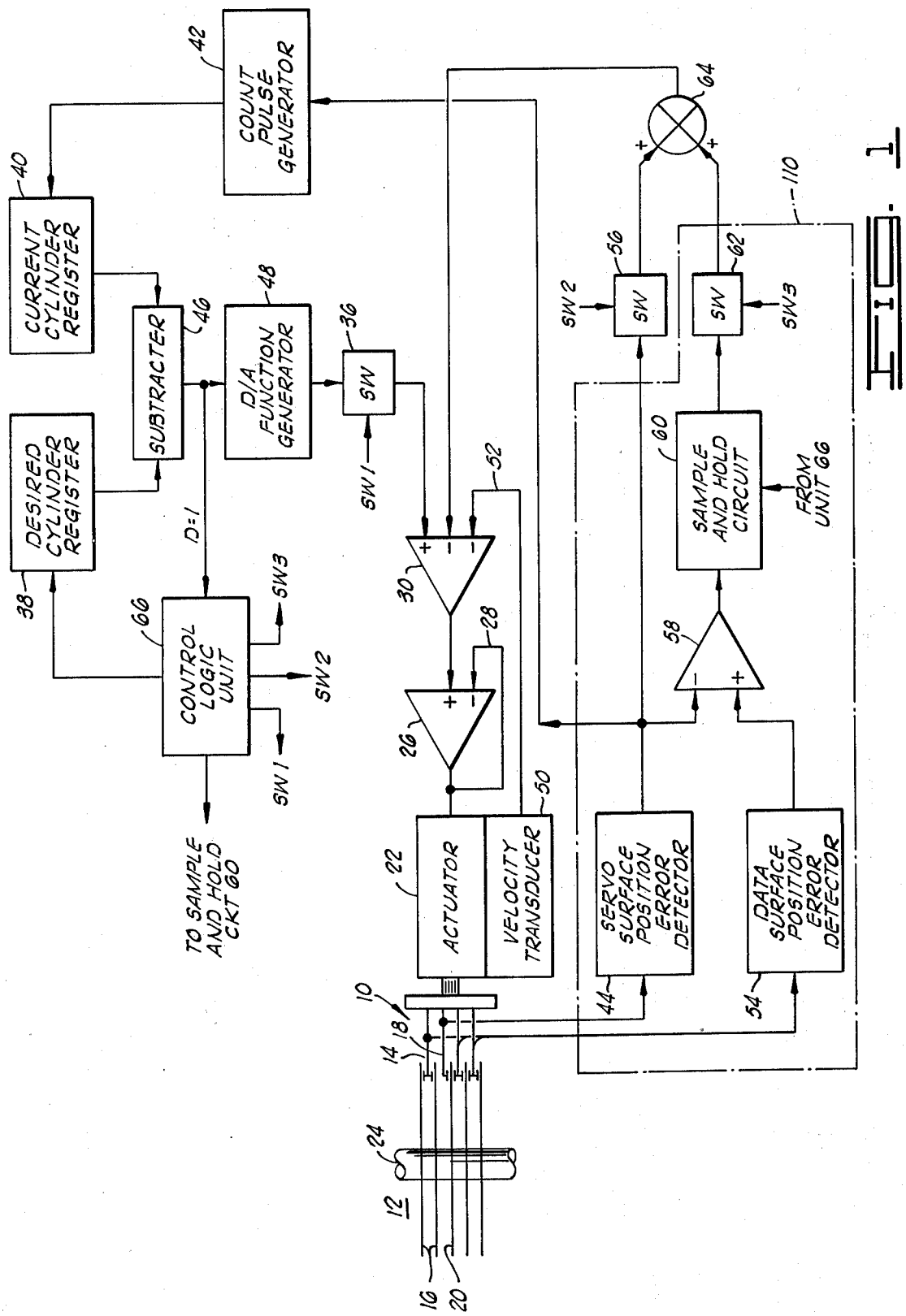
FIG. 1 is a major block diagram of a head positioning servo system embodying the present invention.

Referring now to FIG. 1, the servo system illustrated in block diagram form controls the position of a ganged head assembly 10 relative to tracks on the surfaces of a multiple surface recording medium or disk pack 12. The ganged head assembly 10 includes a plurality of data heads, such as head 14, which can write information onto and read information from data surfaces, such as surfaces 16 in the disk pack 12. The ganged head assembly also includes a servo head 18 capable only of reading pre-recorded servo information carried on a servo surface 20 dedicated to tracks of such information. The ganged head assembly including the data heads and the servo head is mechanically coupled to an actuator 22 capable of moving the heads along a radial from a spindle 24 in the disk pack 12.

The actuator 22 is energized by the output voltage of a power amplifier 26 which is stabilized by a conventional negative feedback loop 28. The controlled input to the power amplifier 26 is provided by a summing amplifier 30 having a plurality of inputs.

One input to the summing amplifier 30 is provided through a switching device 36 which may take the form of a field effect transistor having a controllable gate current. Switching device 36 is in the output circuit of a coarse positioning system which includes a desired cylinder register 38 into which the address of the desired cylinder may be entered by a control logic unit 66. The coarse positioning system also includes a current cylinder register 40, the contents of which are altered during actuator movement (a seek operation) so as to contain the address of the cylinder in which the ganged heads are located at a particular time. The contents of the current cylinder register 40 are updated by pulses supplied from a count pulse generator 42 having its input connected to a servo surface position error detector circuit 44. The detector circuits 44 is, in turn, connected to the servo head 18. Count pulse generator 42 responds to the output of detector circuit 44 by producing a pulse for each cylinder crossed by the servo head. This pulse is used to increment or decrement the current cylinder register 40, depending on the direction of movement of the actuator 22.

The digital difference between the contents of the desired cylinder register 38 and the contents of the current cylinder register 40 is established by digital subtracter circuit 46. The magnitude of the difference represents the distance between the current head location and the desired head location. The established difference signal is applied to a digital to analog function generator 48 which produces a weighted analog signal applied through the switching device 36 to one input of summing amplifier 30. The weighted analog signal, after amplification by amplifier 26 energizes actuator 22 to move that actuator toward the address of the desired cylinder.

The velocity of the movable portion of actuator 22 is detected by a velocity transducer 50. Velocity transducer 50 provides a negative feedback signal to summing amplifier 30 through line 52. The negative feedback signal acts to reduce the acceleration of the actuator 22 and to eventually command deceleration. As the ganged head assembly 10 approaches the desired cylinder, the declining digital difference established by digital subtracter circuit 46 causes the output of the function generator 48 to approach zero. A zero output from function generator 48 indicates the ganged head assembly has reached the desired cylinder.

A conventional coarse positioning system has been described to establish the environment for the present invention. Other coarse positioning systems can be used if they can be inhibited selectively by a device such as switching device 36.

The servo system shown in FIG. 1 has a fine positioning or track following system which includes the servo surface position error detector 44 and a data surface position error detector circuit 54. The servo surface position error detector circuit 44 produces a first variable error signal representing the distance between the current location of the servo head 18 and the centerline of a cylinder over which the servo head is nominally centered. Data surface position error detector circuit 54 is electrically connected to the data heads 14 in the ganged head assembly 10. The error detector circuit 54 produces a variable second error signal representing the distance between the current location of a selected data head and the centerline of a selected track on a data surface.

The first error signal produced by error detector circuit 44 is processed by count pulse generator 42 to derive the cylinder-crossing pulses used during coarse positioning. The first error signal is also applied to a switching device 56 and to one input to a difference amplifier 58. The second error signal produced by the error detector circuit 54 is applied to a second input to the difference amplifier 58. Amplifier 58 generates a signal representing the instantaneous difference between the first error signal and the second error signal. This difference signal is applied to a sample and hold circuit 60, the need for which will become apparent later. The output of sample and hold circuit 60 is applied to a switching device 62. The outputs of switching devices 56 and 62, representing the first error signal and the difference signal, respectively, are input to a summing junction 64. The output of summing junction 64 is shown as a third input to the summing amplifier 30. In practice, summing junction 64 might be eliminated and the outputs of switching device 56 and 62 applied directly to summing amplifier 30.

The servo system described above operates in the following manner. At the beginning of a seek operation, the address of the desired cylinder is loaded into register 38 by control logic unit 66. Switching devices 56 and 62 are opened to disable the fine positioning system and the switching device 36 is closed to enable the coarse positioning system. The digital difference between the desired cylinder address and the current cylinder address is established by digital subtractor circuit 46. This digital difference is converted to a weighted, analog signal by function generator 48. The analog signal, when applied through closed switching device 36, summing amplifier 30 and power amplifier 26, energizes actuator 22 to cause the heads to be driven from their current location toward the desired location.

As the servo head 18 on ganged head assembly 10 crosses each cylinder on the dedicated servo surface 20, count pulse generator 42 generates a pulse. Each pulse increments or decrements current cylinder register 40 depending on the direction of actuator movement to diminish the digital difference established by digital subtractor circuit 46. As the digital difference becomes smaller, the weighted analog signal produced by function generator 48 is reduced to slow the movement of the actuator 22. When subtracter circuit 46 indicates that the ganged head assembly is within a certain distance from the desired cylinder, a signal is applied to a control logic unit 66. Control logic unit 66 produces switch controlling signals SW1 and SW2. Switch control signal SW1 interrupts the path through switching device 36 while switch control signal SW2 simultaneously closes the path through switching device 56, temporarily transferring positioning control of the actuator 22 from the coarse positioning system to the servo surface position error detector circuit 44 alone.

For a brief period, the position of the ganged head assembly 10 is controlled solely as a function of the magnitude of the first error signal produced by the error detector circuit 44. The first error signal is applied through the switching device 56, summing junction 64, summing amplifier 30 and power amplifier 26 to cause the ganged head assembly 10 to be moved to the position in which the servo head 18 is centered above the desired cylinder on servo surface 20. During this period, the fact that a selected data head may be offset relative to the servo head or the center of a selected data track has no effect on the operation of the servo system since the path through the switching device 62 has not yet been closed.

However, when enough time elapses to permit sampling of servo information recorded on the selected data surface, control logic unit 66 generates signal SW3 which closes the path through switching device 62 to bring the actuator 22 under the positioning control of both the error detector circuit 44 and the error detector circuit 54. The closing of switch 62 and the introduction of the second error signal into the system makes it possible to compensate for any offset between the servo head and a selected data head. The compensated position error signal causes the ganged head assembly to be driven to the position in which the selected data head is centered on a selected track; i.e., the second error signal is driven to zero. Further details of the operation of the servo system will be provided as part of a more detailed description of the servo system.

FIG. 2 is a top view of the dedicated servo surface 20 of the multiple surface disk recording medium discussed above. The servo surface 20 is dedicated to concentric tracks, such as track 68, of pre-recorded servo information. Of course, the tracks are not actually visible. In a preferred embodiment of the invention, the radial locations of the servo tracks alternate with the radial locations of data tracks on the data surfaces. That is, each pair of servo tracks on servo surface 20 is nominally centered on a cylinder of data tracks.

Although not shown in FIG. 2, an indexing pattern is recorded at each track along a radial from the center of servo surface 20. This indexing pattern is used to generate timing signals for sampling of servo information recorded on the data surfaces.

FIG. 3 is a top view of a typical data surface 16 in a preferred form of the multiple surface disk recording medium 12. Each data surface is divided magnetically into servo sectors 70 which alternate with much longer data sectors 72. Each of the servo sectors 70 contains pre-recorded servo information identical in format and phrase to the servo information recorded on servo surface 20. Each track of servo information in a sector 70 is nominally recorded at the same radial location as a corresponding track on the servo surface 20 by means of a conventional device known as a servo writer during the manufacture of the recording medium. The servo writer includes a ganged head assembly which is used to record servo information on each of the recording surfaces of the multiple surface medium. While the servo tracks are nominally aligned from one surface to another, in practice the heads in the servo writer may not be exactly aligned, resulting in some misalignment of servo tracks on different surfaces in the same cylinder. However, the present invention compensates for inter-surface misalignment of servo tracks in the same manner as it compensates for misaligned heads.

The servo sectors 70 alternate with the data sectors 72 where binary information can be stored using any suitable recording code. In a preferred embodiment of the invention, each data surface has 8 servo sectors. A lesser number of servo sectors can be used although head positioning time may be increased for reasons which will be apparent later.

The servo information pre-recorded on the dedicated servo surface 20 and in the servo sectors 70 on the data surfaces preferably consists of parallel tracks of uniformly-spaced flux reversals with the flux reversals in one track being out of phase with the flux reversals in the adjacent track. FIG. 4a is a representation of servo flux reversals recorded in two parallel tracks, which are part of a single channel. The flux reversals are written and read as a first series of dibits, such as dibit 74, in an upper servo track 76 and second out-of-phase series of dibits, such as dibit 78, in a lower servo track 80. The terms upper servo track and lower servo track are used only to facilitate reference to the drawings. In fact, the tracks 76 and 80 are located at different radial locations on servo surface 20 or in a servo sector on one of the data surfaces 16. If the servo tracks 76 and 80 are in one of the servo sectors 70 on a data surface 16, the servo tracks are centered on data tracks in the adjoining data sectors. The center line of a continuation of such a data track through the servo sector is represented in FIG. 4a by the dashed line 82 lying midway between the servo tracks 76 and 80. Dashed line 82 is referred to as a continuation of a data track since data is not actually recorded in the servo sectors but only in the adjoining data sectors on each surface.

FIG. 4b illustrates a read signal waveform produced by a head 84, which may be either the servo head or a data head, as the head moves from an initial position P1 centered on lower servo track 80, through an intermediate position P2 midway between the servo tracks 76 and 80, to a final position P3 centered on upper servo track 80. Since head 84 is sensitive to flux reversals recorded in either servo track in the channel, the resulting waveform varies as a function of the location of the head relative to the tracks. During the coarse positioning phase of a seek operation, such a waveform is generated by the servo head 18 as it crosses the tracks on the dedicated servo surface 20. The waveform provides information needed to establish the cylinder-crossing pulses which increment or decrement the current cylinder register 40 discussed with reference to FIG. 1. Such a waveform is also generated during read/write operations both by servo head 18 and by a selected data head as that head traverses a servo sector. During read/write operations, the waveform provides information needed to establish the current offset of each head from the centerline of its addressed track.

Head 84 actually moves across the tracks in a direction indicated by arrow 86 at the same time the medium on which the servo tracks 76 and 80 are recorded moves in a direction indicated by arrow 88. As a result of the perpendicular movements of the head and medium, the head 84 only appears to have moved along a resultant vector from the initial position P1 through position P2 to a final position P3.

Information contained in the read signal waveform is extracted under the control of timing and gating circuits, described in more detail below, to derive signals indicative of the head location relative to the tracks. These circuits sample the magnitudes of positive-going peaks in one servo track and the magnitudes of negative-going peaks in the other servo tracks.

A quantitative indication of the offset of head 84 at position P1 from the center line 82 is obtained by comparing the peak values of excursions 94 and 96, which correspond to dibit peaks 90 and 92, respectively. The result is a negative error signal occurring at a time arbitrarily designated as time T1 in FIG. 4c.

As the head 84 approaches the center line 82, the read signal components detected from the servo track 76 become stronger as the read signal components detected from track 80 become weaker. When the head 84 is on center or at position P2, the positive-going peaks on servo tracks 76 and the negative-going peaks on servo track 80 produce a read signal having excursions of equal magnitude but opposite polarity. That is, positive-going dibit peak 98 in track 76 and negative-going dibit peak 100 in track 80 are read as excursions 102 and 104 in the read signal waveform. Excursions 102 and 104 have the same absolute magnitude but opposite polarities. The summation of these two excursions results in a zero error signal at a time T2.

When the head 84 has moved beyond position P2 into a position P3 centered on servo track 76, a positive error signal is produced at a time T3 due to the positive difference between the positive-going excursion 106 generated by the reading of servo track 76 and the negative-going excursion 108 generated by the reading of servo track 80.

During the coarse positioning phase of a seek operation, count pulse generator 42 responds to the maximum peaks generated by a head straddling a servo track, as head 84 does at positions P1 and P3, to produce the cylinder crossing pulses which increment or decrement the contents of the current cylinder register 40.

When head 84 has moved past servo track 76 into a region between track 76 and the next servo track (not shown), logic is employed to cause the negative-going excursions on track 76 to be compared with the positive-going excursions on the next servo track. This logic responds to the contents of the current cylinder register 40. If register 40 indicates the head is in the region of a data track having an even address, the peaks selected for sampling in a particular servo track will be of a different polarity than if the head is over a data track having an odd address.

The circuits used to generate and combine the error signals discussed above are described with reference to FIG. 5, a block diagram of that portion of the fine positioning system shown within the dotted outline 110 in FIG. 1. The servo surface position error detector circuit 44 includes a gain controlled amplifier 112 which accepts an input signal from the servo head circuit. Positive-going outputs from the gain controlled amplifier 112 are applied both to a positive peak detector circuit 114 and to a timing pulse generator circuit 116. Negative-going outputs from the gain controlled amplifier 112 are applied to timing pulse generator 116 and to a negative peak detector circuit 118.

Timing pulse generator circuit 116 can be a conventional circuit including positive and negative threshold detectors and a differentiator/zero crossing detector circuit, all of which function to detect the time of occurrence of the positive and negative peaks of the servo track flux reversals detected by the servo head. A stream of pulses, each occurring at a positive or negative servo read signal peak, is generated by circuit 116 and is applied to an odd/even pulse discriminator circuit 120.

The pulse train applied to circuit 120 consists of nonuniformly spaced pulses. Circuit 120 converts this pulse train to a train having regularly occurring pulses by suppressing either the odd numbered or even numbered pulses in the train.

The stream of pulses occurring at either odd or even numbered servo signal peaks is applied by odd/even pulse discriminator circuit 120 to a conventional phase locked loop oscillator 122 which would include a phase detector, a loop filter amplifier and a voltage controlled oscillator. The oscillator 122 preferably includes a counter which divides the pulse stream frequency down to the frequency of a main servo clock signal. The main servo clock signal is applied to a divide by two phased flip-flop 124 having a second input from the odd/even pulse discriminator circuit 120. The function of the phased flip-flop 124 is to enable the positive peak detector circuit 114 and the negative peak detector circuit 118 through a peak detector gating circuit 126 so that the positive pulses and the negative pulses read from the two servo tracks are sampled in their respective positive and negative peak detector circuits 118 and 114.

The output of positive peak detector circuit 114 is applied to a summing amplifier 132 in a gain controlling feedback loop and to an additive input to difference amplifier 138. The output of the negative peak detector circuit 118 is applied both to summing amplifier 132 and as a subtractive input to the difference amplifier 138. Although not shown in the drawing, a conventional loop filter circuit may be connected in series with amplifier 132.

Summing amplifier 132 sums the positive feedback from the peak detector circuits 114 and 118 with a negative input from an AGC reference voltage source to control the gain of amplifier 112. Difference amplifier 138 produces an analog signal proportional to the difference of the sampled positive and negative peaks detected by circuits 114 and 118. The output of amplifier 138 is the first error signal representing the position error or offset of servo head 18 from the center line of a selected channel on the dedicated servo surface 20. This first error signal is applied to the difference amplifier 58, to count pulse generator 42 shown in FIG. 1, and to switching device 56 also shown in FIG. 1.

The data surface position error detector circuit 54 is connected to a read/write head select and preamplifier circuit 140 which is, in turn, connected to the individual data heads 14. The read/write head select and preamplifier circuit 140 is connected both to read/write circuitry (not shown) and to a gain-controlled amplifier 142 through a switching device 144. Switching device 144 completes the electrical connection between data surface position error detector circuit 54 and a selected data head during the time the data head is traversing a servo sector on the data surface. Switching device 144 remains open while the data head traverses a data sector.

The positive going outputs from the gain controlled amplifier 142 are applied to a positive peak detector circuit 146 and to one input of a timing pulse generator 148. The negative going outputs from gain controlled amplifier 142 are applied to a negative peak detector circuit 150 and to the timing pulse generator circuit 148. Timing pulse generator 148 is connected to an odd/even pulse discriminator circuit 152 which drives a phase locked loop oscillator 154. The phase locked loop oscaillator 154 triggers a divide-by-two phased flip-flop 156 which responds to second input from the odd/even pulse discriminator circuit 152 to enable a peak detector gating circuit 158 at selected times.

The function of each of the components described above is identical to the function of corresponding components in the servo surface position error detector circuit. That is, the combination of timing pulse generator circuit 148, odd/even pulse discriminator circuit 152, phase locked loop oscillator 154, phase flip-flop 156 and peak detector gating circuit 158 enables the positive peak detector 146 and the negative peak detector circuit 150 to detect the positive pulses and the negative pulses, respectively.

Outputs from the positive peak detector circuit 146 and the negative peak detector circuit 150 are applied both to a difference amplifier 160 and to a summing amplifier 162 in a gain control feedback loop. This feedback loop includes a switching device 164 which is driven between its open and closed states in phase with the switching device 144. The output of the switching device 164 provides an input to an amplifier 166 having a holding capacitor 168 connected between its input and its output. The output of the amplifier 166 is applied to the gain controlled amplifier 142. A conventional loop filter circuit (now shown) may be connected in series with the amplifier 166.

While the selected data head is traversing a data sector, switching devices 144 and 164 remain open due to the absence of a switching signal over a line 170 from control logic unit 66. During this time, the gain of amplifier 142 is held at a level determined by the voltage on capacitor 168. When the data head reaches the leading boundary of the next servo sector, a timing pulse is provided over line 170 to close switching devices 144 and 164. While the switching devices are closed, the servo information detected by the selected data head is transmitted to gain controlling amplifier 142 while the gain of amplfier 142 is controlled as a function of the feedback voltage through the loop including summing amplifier 162, switching device 164 and amplifier 166. The feedback voltage charges holding capacitor 168 to provide the gain-holding voltage for amplifier 142 during the traverse of the following data sector.

The difference amplifier 160 generates a second error signal having a magnitude related to the position error of the selected data head; that is, the offset of the head from the center line of the selected track. Thus, while the data head is traversing a servo sector, the circuitry described provides both a first error signal representing the position error of the servo head relative to the addressed channel on the servo surface and a second error signal representing the position error of the selected data head relative to the same channel on the data surface.

A positive output from the difference amplifier 160 and a negative output from the amplifier 138 are applied to a difference amplifier 58 to produce a combined difference signal representing the offset of the selected data head and data track relative to the servo head and servo track. This combined error signal is applied to the sample and hold circuit 60 which maintains the signal after the selected data head leaves the servo sector to traverse the succeeding data sector.

The output terminal of sample and hold circuit 60 is connected to a buffer amplifier 172. The output terminal of amplifier 172 is connected both to a switching device 174 and to the input terminal of an inverting amplifier 176 having a switching device 178 in its output circuit. Switching devices 174 and 178 are under the control of an offset polarity control circuit 182 which responds to control signals provided by control logic unit 66 to control the polarity of the combined difference signal as a function of the cylinder address. When switching device 174 is closed, amplifier 172 provides a positive input signal to a summing junction 180. When switching device 178 is closed, amplifier 176 provides a negative input signal of the same magnitude. The output of summing junction 180 is applied to the switching device 62 illustrated in FIG. 1.

In a preferred embodiment, the recording medium has eight equally spaced servo sectors on each data surface. When control is being transferred from the coarse positioning system near the end of a seek operation, the simultaneous opening of switching device 36 and closing of switching device 56 places the system under the control of the servo surface position error detector circuit only. However, when a selected data head has reached the leading boundary of a servo sector, control logic unit 66 sends a switch closing signal to switching devices 144 and 164 in the data surface position error detector circuit 54 to allow that circuit to sample the servo information stored in the sector. Switching device 62 is closed as the selected data head approaches the end of the servo sector to bring the actuator under the combined control of the position error detector circuits 44 and 54. During the remainder of the read/write operation, control logic unit 66 triggers sample and hold circuit 60 during each traverse of a servo sector to accept and hold a new combined error signal.

The number of servo sectors per data surface could be reduced from eight to even one sector. However, since the system is depending on the servo surface position error until a servo sector on a data surface has been traversed by a selected data head and a second error signal generated, a lesser number of servo sectors per surface will necessarily result in a longer settling time and fewer data head position corrections during each revolution of the disk.

FIG. 6 represents the error signals generated in the circit described above when a servo head and a selected data simultaneously detect servo information on both the servo surface and in a servo sector on a data ssurface of the recording medium. FIG. 6a represents the position of a servo head 184 relative to tracks 186 and 188 of servo information on the dedicated servo surface. FIG. 6b represents the position of a selected data head 190 relative to servo tracks 192 and 194 in the same cylinder on a selected data surface. To illustrate the invention, it is assumed that the data head 190 is misaligned from the servo head 184 in the ganged assembly including both heads. That is, when servo head 184 is centered between the servo tracks 186 and 188, the data head 190 is off center toward the servo track 194. The offset between the servo head 184 and the data head 190 remains constant since the heads are rigidly positioned relative to one another by the assembly.

At a time $t_1$ the servo head 184 is centered while the data head 190 is slightly below center. Servo surface position error detector circuit 44 functions in the manner explained with reference to FIG. 4 to produce a zero servo surface position error signal. Simultaneously, as a consequence of the offset of data head 190, data surface position error detector circuit 54 produces the negative data surface position error signal shown in FIG. 6d. The subtraction of the servo error signal from the data error signal results in a negative error signal at the input to the sample and hold circuit 60. When the negative error signal provided by sample and hold circuit 60 is combined with the servo surface position error signal in summing junction 64, the output of junction 64 is a negative position error input to the summing amplifier 30. This negative input drive actuator 22 in a direction which reduces the magnitude of the negative error signal; i.e., in a direction tending to center the data head 190 between the servo tracks 192 and 194.

At time $t_3$, data head 190 has been driven into a position centered between the servo tracks 192 and 194 resulting in a zero data surface position error. Servo head 184 is nearer the center line of servo track 186, which results in a positive error signal at the output of error detector circuit 44. The subtraction of the positive servo surface position error signal from the zero data surface position error signal continues to result in a fixed negative error signal at the output of sample and hold circuit 60. The summation of the positive servo surface position error signal and the fixed negative error signal results in a zero input to the summing amplifier 30 from the summing junction 64. This zero input should prevent further actuator motion relative to the disk surface.

If, however, the head 190 has overshot its centered position due to mechanical inertia or if the disk wobbles during rotation, the heads 184 and 190 may move into the positions illustrated at time $t_4$. In the illustrated position, servo head 184 would be the source of a highly positive servo surface error signal while the position of data head 190 would result in a positive data surface error signal of lesser magnitude. The subtraction of the highly positive servo surface position error signal from the less positive data surface position error signal results in a fixed negative error signal at the output of a sample and hold circuit 60. The summation of the fixed negative error signal with the positive servo surface position error signal results in a slightly positive input to summing amplifier 30. This positive input energizes actuator 22 to drive the data head 190 back toward the center line between the servo tracks 192 and 194.

At time $t_5$, the data head 190 has returned to the center line between servo tracks 192 and 194 resulting in a zero error signal from the data surface position error circuit 54. The movement of the servo head 184 toward the center line between servo tracks 186 and 188 results in a reduced positive servo surface position error signal. The fixed negative error signal at the input to sample and hold circuit 60 is of the same magnitude but the opposite polarity from the servo surface position error signal. Therefore, the summation of the two signals results in a zero signal at the input to the summing amplifier 30, allowing data head 190 to remain on center until some further disturbance occurs.

The preceding description has assumed that the servo tracks on the different surfaces do not shift relative to a vertical through the tracks; that is, that head-to-track center changes on one surface occur in synchronism with head-to-track center changes on another surface. In fact, the wobble of the disk packe may cause dissimilar changes in head-to-track center spacing. However, the error introduced by wobble is slight and can be ignored without seriously compromising the effectiveness of the servo system.

The head positioning servo system continues to operate in the manner described during the remainder of the read/write operation. Each time the selected data head traverses a servo sector, a new data surface position error signal is generated. This new error signal is used to re-center the data head if the head moved off center while traversing the preceding data sector.

If another data head in the same cylinder is selected, the head positioning servo system continues to operate in the manner described. Only the input from the read/write head select and preamplifier circuit 140 changes. However, when a data head in another cylinder is selected, control logic unit 66 opens switching devices 164, 144, 56 and 62 and closes switching device 36 to return actuator 22 to the control of the course positioning system.

One of the advantages of the present invention over the prior art systems having only a dedicated servo surface is that the data surface servo compensation permits each selected data head to be centered on track rather than only the servo head. An advantage over the prior art systems wherein servo information was confined to the data surfaces is that a write failure at the data surfaces of the present system will not totally destroy servo capability. The continued operation of the servo surface position error detector circuit 44 will continue to provide limited servoing ability.

The present system can use the regularly occurring dibit patterns on the dedicated servo surface 20 to generate track count pulses required during coarse positioning. Prior art systems in which servo information was confined to the data surface provided less reliable coarse positioning because of difficulties in separating data from servo information establish the track count pulses.

A significant advantage of the present invention over prior art single surface systems is that considerably fewer servo sectors are needed on each data surface to stabilize the servo loop. Whereas the present invention preferably employs eight servo sectors per surface, prior art system required one hundred or more servo sectors for stability, significantly reducing data format capacity of such systems.

While there has been described what is considered to be a preferred embodiment of the invention, variations and modifications in the invention may occur to those skilled in the art once they become acquainted with the invention. Therefore, it is intended that the appended claims shall be construed as including all such variations and modifications as would occur to one of ordinary skill in the art.

I claim:

1. For use in a disk drive employing a ganged head assembly and a multiple surface disk recording medium having at least one servo surface dedicated to channels of servo information and one or more data surfaces having channels containing data and servo information, a head positioning servo system comprising:
   a. a servo surface position error circuit including a servo head in the ganged head assembly for generating a first error signal representing the position of the servo head relative to the center of a selected channel on the servo surface;
   b. a data surface position error circuit connected to the other heads in the ganged head assembly for generating a second error signal representing the position of a selected head relative to the center of a selected channel on a data surface;
   c. a difference circuit connected to the servo surface position error circuit and the data surface position error circuit and the data surface position error circuit for establishing a difference signal representing the difference of the first error signal and the second error signal; and
   d. head positioning means responsive to the sum of the first error signal and the difference signal for moving the transducer assembly toward a position wherein the second error signal is minimized.

2. A head positioning servo system as recited in claim 1 wherein each data surface is divided into sectors of servo information alternating with sectors in which data may be recorded and wherein said servo system further includes timing means for causing said data surface position error circuit to generate an updated second error signal each time a selected head traverses a servo selector on a selected channel.

3. A head positioning servo system as recited in claim 2 wherein said difference circuit further includes a sample and hold circuit for maintaining the most recently generated difference signal as the selected head traverses the following data sector.

4. A head positioning servo system as recited in claim 3 wherein the channels of servo information on the servo surface and in the servo sectors on the data surfaces comprise parallel tracks, each track containing uniformly repeated dibits recorded out of phase with the dibits in the adjacent track.

5. A head positioning servo system as recited in claim 4 wherein the tracks of servo information alternate with the tracks in which data may be recorded.

6. A head positioning servo system as recited in claim 5 wherein said servo surface position error circuit and said data surface position error circuit each includes:
   a. a positive peak detector circuit for detecting the positive peak values of dibits in one track;
   b. a negative peak detector circuit for detecting the negative peak values of dibits in an adjacent track; and
   c. A difference circuit having inputs from said peak detector circuits for generating an error signal which at a particular time represents the difference between a current positive peak value read from one track and a current negative peak value read from the other track.

7. In a disk drive including a ganged head assembly and a multiple surface disk recording medium having at least one servo surface dedicated to tracks of servo information and one or more data surfaces having channels of data and servo information, a head positioning servo system comprising;

a. a head positioning means including an actuator connected to the ganged head assembly, a drive circuit for energizing said actuator, and a summing amplifier for providing an input signal to said drive circuit;

b. a coarse positioning system connected to said summing amplifier for providing an input signal having a value related to the distance between the current cylinder position of a selected head and the desired cylinder position of that head to move the selected head to within a predetermined distance from the desired cylinder position;

a fine positioning system for maintaining the selected head on center on the desired track comprising:

i. a servo surface position error circuit including a servo head in the head assembly for generating a first error signal representing the position of the servo head relative to the center of a channel on the servo surface corresponding to the selected track on the data surface, ii. a data surface position error circuit connected to the other heads in the head assembly for generating a second error signal representing the position of the selected head relative to the center of the selected track, iii. a difference circuit for establishing a difference signal representing the difference of the first error signal and the second error signal, and iv. means for applying the first error signal and the difference signal to said summing amplifier in said head positioning means.

8. A head positioning servo system as recited in claim 7 wherein each data surface is divided into sectors of servo information alternating with sectors in which data may be recorded and wherein said servo system further includes timing means for causing said data surface position error circuit to generate an updated second error signal each time a selected head traverses a servo sector on a selected track.

9. A head positioning servo system as recited in claim 8 wherein said difference circuit further includes a sample and hold circuit for maintaining the most recently generated difference signal as the selected head traverses the data sector following the servo sector for which the difference signal was generated.

10. A head positioning servo system as recited in claim 9 wherein the channels of servo information on the servo surface and in the servo sectors on the data surfaces comprises parallel tracks, each track containing uniformly repeated dibits recorded out of phase with the dibits in the adjacent track.

11. A head positioning servo system as recited in claim 10 wherein the tracks of servo information alternate with the tracks in which data may be recorded.

12. A head positioning servo system as recited in claim 11 wherein said servo surface position error circuit and said data surface position error circuit each includes:

a. a positive peak detector circuit for detecting the positive peak value of dibits in one track;

b. a negative peak detector circuit for detecting the negative peak values of dibits in an adjacent track; and c. a difference circuit having inputs from said peak detector circuits for generating an error signal which at a particular time represents the difference between a current positive peak value read from one track and a current negative peak value read from the other track.

13. For use in a disk drive employing a multiple surface disk recording medium having at least one servo surface dedicated to channels of servo information and one or more data surfaces having channels containing data and servo information, a method of mantaining a selected head from a ganged head assembly on center on a selected track on a data surface comprising the steps of:

a. generating a first error signal representing the position of a servo head relative to the center of a selected channel on the servo surface;

b. generating a second error signal representing the position of the selected head relative to the center of the selected track;

c. generating a difference signal representing the difference of the first error signal and the second error signal;

d. summing the first error signal and the difference signal; and e. moving the ganged head assembly as a function of the summed signal toward a position wherein the second error signal is minimized.

14. A method as recited in claim 13 for use where each data surface of the recording medium is divided into sectors of servo information alternating with sectors in which data may be recorded comprising the steps of generating an updated second error signal each time the selected head traverses a servo sector on the selected track and maintaining the most recently generated difference signal as the selected head traverses the data sector following each servo sector.

* * * * *